United States Patent
Park et al.

(10) Patent No.: US 8,264,566 B2
(45) Date of Patent: Sep. 11, 2012

(54) METHOD FOR PROCESSING IMAGE AND PORTABLE TERMINAL HAVING CAMERA THEREOF

(75) Inventors: Woon Ki Park, Seoul (KR); Sang Won Kim, Seoul (KR); Kyoo Sung Choi, Seoul (KR); In Kyung Ryu, Seoul (KR); Seong Chan Byun, Seoul (KR)

(73) Assignee: LG Electronics Inc., Seoul (KR)

( * ) Notice: Subject to any disclaimer, the term of this patent is extended or adjusted under 35 U.S.C. 154(b) by 476 days.

(21) Appl. No.: 12/622,799

(22) Filed: Nov. 20, 2009

(65) Prior Publication Data

US 2010/0271500 A1 Oct. 28, 2010

(30) Foreign Application Priority Data

Apr. 28, 2009 (KR) .................. 10-2009-0037320

(51) Int. Cl.
*H04N 5/228* (2006.01)
*H04N 5/262* (2006.01)
*H04N 5/335* (2011.01)
*H04N 5/222* (2006.01)
*H04N 11/20* (2006.01)

(52) U.S. Cl. ............. 348/222.1; 348/239; 348/272; 348/333.11; 348/459

(58) Field of Classification Search ............ 348/222.1, 348/459, 239, 272, 333.11
See application file for complete search history.

(56) References Cited

U.S. PATENT DOCUMENTS

| 7,304,681 B2 * | 12/2007 | Larner et al. ........... 348/352 |
| 7,692,696 B2 * | 4/2010 | Steinberg et al. ....... 348/239 |
| 7,978,234 B2 * | 7/2011 | Yano et al. ............. 348/239 |

* cited by examiner

*Primary Examiner* — Chieh M Fan
*Assistant Examiner* — Quang Le
(74) *Attorney, Agent, or Firm* — Birch, Stewart, Kolasch & Birch, LLP

(57) ABSTRACT

Disclosed is an apparatus and method for processing image data in a portable terminal including obtaining a first image having a first resolution for display from an image obtaining unit of the portable terminal, receiving a semi-shutter signal during display of the first image on a display unit of the portable terminal, obtaining a second image having a second resolution from the image obtaining unit in response to the semi-shutter signal prior to receiving a full-shutter signal, and capturing a still image from the second image when the full-shutter signal is received.

19 Claims, 6 Drawing Sheets

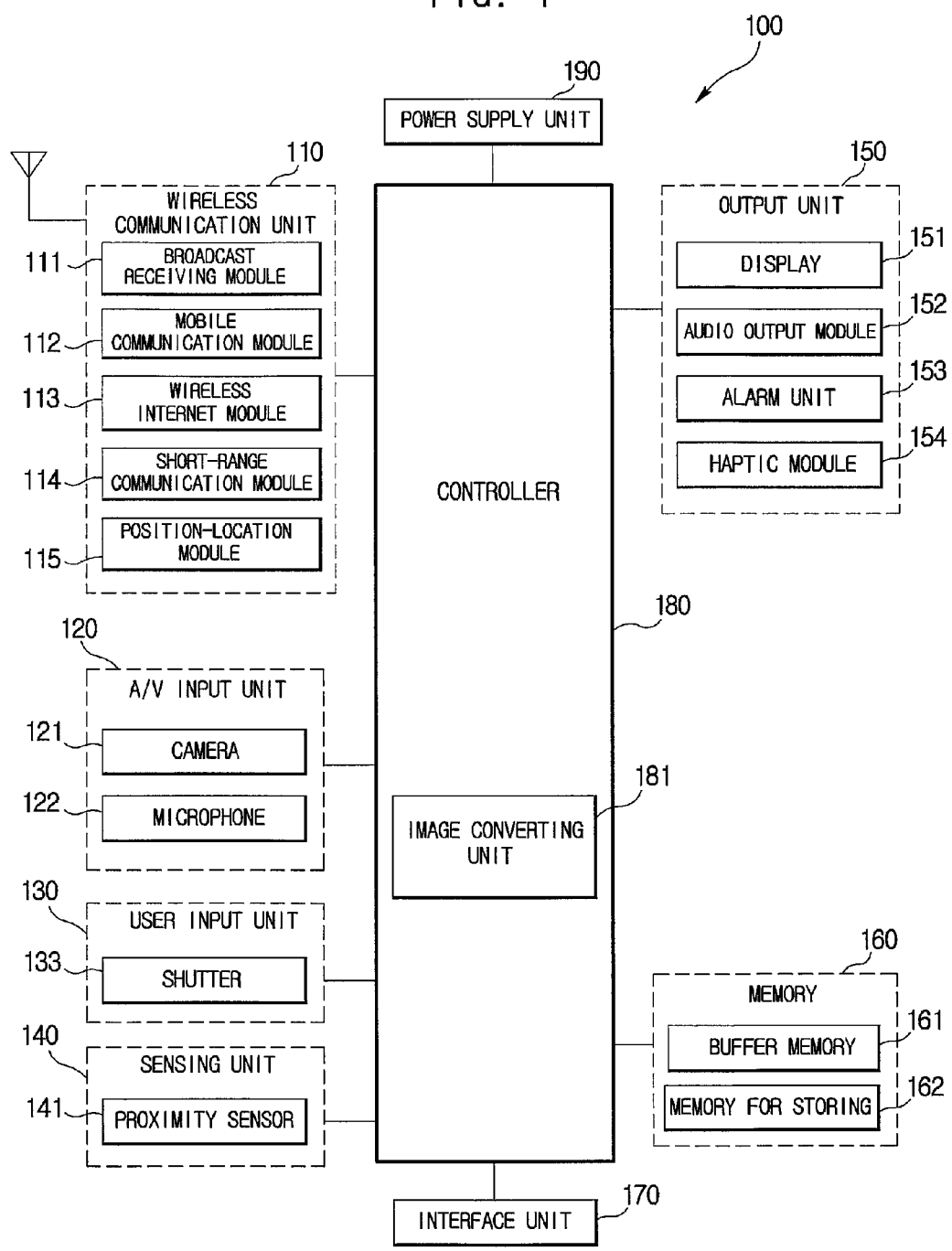

METHOD FOR PROCESSING IMAGE AND PORTABLE TERMINAL HAVING CAMERA THEREOF

This application claims the benefit of the Korean Patent Application No. 10-2009-0037320, filed on Apr. 28, 2009, which is hereby incorporated by reference as if fully set forth herein.

BACKGROUND OF THE DISCLOSURE

1. Field of the Disclosure

The present disclosure relates to a method for processing an image and a portable terminal having a camera thereof.

2. Discussion of the Related Art

Generally, terminals can be classified into mobile/portable terminals and stationary terminals. The portable terminals can be further classified into handheld terminals and vehicle mount terminals according to possibility of user's direct portability.

As functions of the terminals are diversified, the terminals are implemented as a multimedia player provided with various functions such as ability to take photos or moving pictures, playback of music or moving picture files, support of game play, reception of broadcast and the like, for example.

To support and increase the terminal functions, the improvement of structural parts and/or software parts of the terminal may be considered.

The portable terminals may include the digital camera functions. A digital camera comprises a lens configured to form an optical image of a subject, a CCD (Charge Coupled Device) sensor configured to convert an optical signal to an electrical image signal corresponding to the optical signal, and image processing means for processing an image signal. Recently, the digital camera has been able to perform various functions, such as a zoom function, a night photographing function, and a macro photographing function.

SUMMARY OF THE DISCLOSURE

According to an embodiment of the present disclosure, provided is a method for processing image data in a portable terminal, the method including obtaining a first image having a first resolution for display from an image obtaining unit of the portable terminal; receiving a semi-shutter signal during display of the first image on a display unit of the portable terminal; obtaining a second image having a second resolution from the image obtaining unit in response to the semi-shutter signal prior to receiving a full-shutter signal; and capturing a still image from the second image when the full-shutter signal is received.

According to another embodiment of the present disclosure, provided is a portable terminal including a camera which includes an image obtaining unit to obtain a first image having a first resolution and a second image having a second resolution; a shutter which selectively generates a semi-shutter signal and a full-shutter signal; a display unit which displays the first image; and a controller which controls display of the first image on the display unit when the camera is activated, and controls the image obtaining unit to obtain the second image when the semi-shutter signal is generated from the shutter during the display of the first image on the display unit and prior to generation of the full-shutter signal.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

It is to be understood that both the foregoing general description and the following detailed description of the present disclosure are explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 1 is a block diagram of a portable terminal according to one embodiment of the present disclosure.

DETAILED DESCRIPTION OF THE DISCLOSURE

Figure 2A:
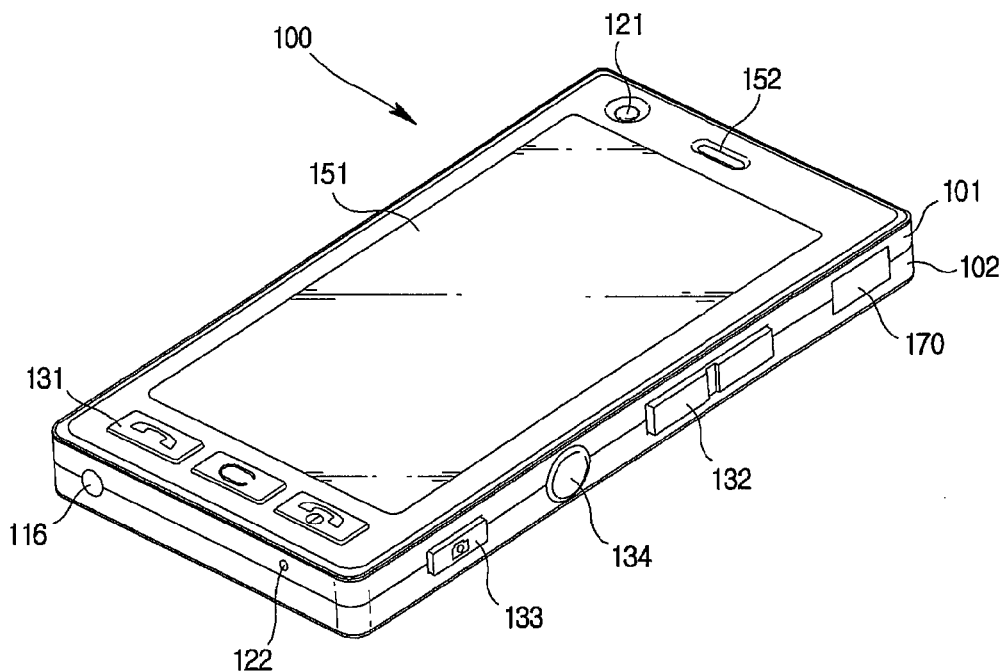
FIG. 2A is a front perspective view of a portable terminal related to one embodiment of the present disclosure.

Reference will now be made in detail to the preferred embodiments of the present disclosure, examples of which are illustrated in the accompanying drawings. Wherever possible, the same reference numbers will be used throughout the drawings to refer to the same or like parts. The suffixes 'module' and 'unit' for the elements used in the following description are given or used in common to facilitate writing this disclosure and without meanings or roles that discriminate them from each other.

The portable terminal described in the present disclosure may refer to a mobile phone, a smart phone, a notebook computer, a digital broadcasting terminal, a PDA (Personal Digital Assistance), a PMP (Portable Multimedia Player) and a GPS navigation device and the like.

Except for a case applicable to a portable terminal only, it is apparent to those skilled in the art that the configurations according to an embodiment described in this disclosure is applicable to such a stationary terminal as a digital TV, a desktop computer and the like.

FIG. 1 is a block diagram of a portable terminal according to one embodiment of the present disclosure. Referring to FIG. 1, a portable terminal 100 according to one embodiment of the present disclosure includes a wireless communication unit 110, an A/V (audio/video) input unit 120, a user input unit 130, a sensing unit 140, an output unit 150, a memory 160, an interface unit 170, a controller 180, a power supply unit 190, and the like. FIG. 1 shows the portable terminal 100 having various components, but it is understood that implementation of all of the illustrated components is not a requirement. Greater or fewer components may alternatively be implemented.

In the following description, the above elements of the portable terminal 100 are explained in sequence. First of all, the wireless communication unit 110 typically includes one or more components which permit wireless communication between the portable terminal 100 and a wireless communication system or network within which the portable terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitably for other broadcasting systems as well as the above-explained digital broadcasting systems. The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data signals according to text/multimedia message transceivings, among others.

The wireless internet module 113 supports Internet access for the portable terminal 100. This module may be internally or externally coupled to the portable terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well as the networking technologies commonly referred to as Bluetooth and ZigBee, to name a few.

The position-location module 115 identifies or obtains the location of the portable terminal 100. If desired, this module may be implemented by a global positioning system (GPS) module.

Referring to FIG. 1, the audio/video (A/V) input unit 120 is configured to provide audio or video signal inputs to the portable terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the portable terminal 100 according to environment of usage. Referring to FIG. 3, the camera 121 may include a lens, an image sensor 121-1, and an image sensing processor 121-2. The lens may include a zoom lens for enlarging or reducing a size of the subject for photography, a focus lens for adjusting a focus of the subject for photography, and an aperture for adjusting a quantity of the light. An optical signal for the subject is received from the lens. The image sensor 121-1 converts the optical signal to the electric signal. The image sensor processor 121-2 processes to convert the electric signal to the digital signal.

The microphone 122 receives an external audio signal while the portable device is in a particular mode, such as phone call mode, recording mode and voice recognition mode. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the portable terminal 100 using status measurements of various aspects of the portable terminal. For instance, the sensing unit 140 may detect an open/close status of the portable terminal 100, relative positioning of components (e.g., a display and keypad) of the portable terminal 100, a position change of the portable terminal 100 or a component of the portable terminal 100, a presence or absence of user contact with the portable terminal 100, orientation or acceleration/deceleration of the portable terminal 100.

As an example, consider the portable terminal 100 being configured as a slide-type portable terminal. In this configuration, the sensing unit 140 may sense whether a sliding portion of the portable terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141 and a touch sensor 142.

The output unit 150 generates outputs relevant to senses of sight, hearing, touch and the like. And, the output unit 150 includes the display 151, an audio output module 152, an alarm unit 153, and a haptic module 154 and the like.

The display 151 is typically implemented to visually display (output) information associated with the portable terminal 100. For instance, if the portable terminal is operated in a phone call mode, the display will generally provide a user interface (UI) or a graphical user interface (GUI) which includes information associated with placing, conducting, and terminating a phone call. As another example, if the portable terminal 100 is in a video call mode or a photographing mode, the display 151 may additionally or alternatively display images which are associated with these modes, the UI or the GUI.

The display module (or display) 151 may be implemented using known display technologies including, for example, a liquid crystal display (LCD), a thin film transistor-liquid crystal display (TFT-LCD), an organic light-emitting diode display (OLED), a flexible display and a three-dimensional (3-D) display. The portable terminal 100 may include one or more of such displays.

Some of the above displays can be implemented in a transparent or optical transmittive type, which can be named a transparent display. As a representative example for the transparent display, there is a TOLED (transparent OLED) or the like. A rear configuration of the display 151 can be implemented in the optical transmittive type as well. In this configuration, a user is able to see an object in rear of a terminal body via an area occupied by the display 151 of the terminal body.

At least two displays 151 can be provided to the portable terminal 100 in accordance with the implemented configuration of the portable terminal 100. For instance, a plurality of displays can be arranged on a single face of the portable terminal 100 in a manner of being spaced apart from each other or being built in one body. Alternatively, a plurality of displays can be arranged on different faces of the portable terminal 100.

In a case that the display 151 and a sensor for detecting a touch action (hereinafter called 'touch sensor') configures a mutual layer structure (hereinafter called 'touch screen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, the touch sensor may be configured to detect a pressure of a touch as well as a touched position or size. Alternatively, a separate pressure sensor may be applied to detect a pressure of the touch.

If a touch input is given to the touch sensor 142, signal(s) corresponding to the touch is transferred to a touch controller. The touch controller processes the signal(s) and then transfers the processed signal(s) to the controller 180. Therefore, the controller 180 is able to determine whether a prescribed portion of the display 151 is touched.

Referring to FIG. 1, a proximity sensor can be provided to an internal area of the portable terminal 100 enclosed by the touch screen or around the touch screen. The proximity sensor is a sensor that detects a presence or non-presence of an object approaching a prescribed detecting surface or an object existing around the proximity sensor using an electromagnetic field strength or infrared ray without mechanical contact. Hence, the proximity sensor has longer durability than that of a contact type sensor and also has wider utility than that of the contact type sensor.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs an audio signal relating to a particular function (e.g., call received, message received, etc.). The audio output module 152 is often implemented using one or more speakers, buzzers, other audio producing devices, and combinations thereof.

The alarm unit 153 outputs a signal for announcing an occurrence of a particular event associated with the portable terminal 100. Typical events include a call received event, a message received event and a touch input received event. The alarm unit 153 can output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibrations. For instance, the haptic module 154 generates an effect attributed to the arrangement of pins vertically moving against a contact skin surface, an effect attributed to the injection/suction power of air through an injection/suction hole, an effect attributed to a skim over a skin surface, an effect attributed to a contact with an electrode, an effect attributed to a electrostatic force, an effect attributed to representation of warm/cold sense using an endothermic or exothermic device and the like.

The haptic module 154 can be implemented to enable a user to sense a tactile effect through a muscle sense of finger, arm or the like as well as to transfer the tactile effect through a direct contact. Optionally, at least two haptic modules 154 can be provided to the portable terminal 100 in accordance with the corresponding configuration type of the portable terminal 100.

The memory 160 is generally used to store programs for operating the controller. Moreover, the memory 160 may temporarily store input/output data such as phonebook data, massage data, still image, and moving image. In addition, data for various patterns of vibration and/or sound outputted in case of a touch input to the touch screen can be stored in the memory 160.

The memory 160 may be implemented using any type or combination of suitable volatile and non-volatile memories or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the portable terminal 100 is able to operate in association with a web storage for performing a storage function of the memory 160 on Internet.

The interface unit 170 is often implemented to couple the portable terminal 100 with external devices. The interface unit 170 receives data from the external devices or is supplied with the power and then transfers the data or power to respective elements of the portable terminal 100 or enables data within the portable terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is a chip for storing various kinds of information for authenticating a use authority of the portable terminal 100 and can include User Identify Module (UIM), Subscriber Identify Module (SIM), Universal Subscriber Identity Module (USIM) and/or the like. A device having an identity module (hereinafter called 'identity device') can be manufactured as a smart card. Therefore, the identity device is connectable to the portable terminal 100 via a relevant port.

When the portable terminal 110 is connected to an external cradle, the interface unit 170 becomes a passage for supplying the portable terminal 100 with a power from the cradle or a passage for delivering various command signals inputted from the cradle by a user to the portable terminal 100. Each of the various command signals inputted from the cradle or the power can operate as a signal enabling the portable terminal 100 to recognize if it is correctly loaded in the cradle.

The controller 180 typically controls the overall operations of the portable terminal 100. For example, the controller 180 performs the control and processing associated with voice calls, data communications, video calls, etc. The controller 180 may include a multimedia module (an image converting unit) 181 that provides multimedia playback. The multimedia module 181 may be configured as part of the controller 180, or implemented as a separate component. In addition, the controller 180 has a time counting function.

Moreover, the controller 180 is able to perform a pattern recognizing process for recognizing a writing input or a picture drawing input carried out on the touch screen as characters or images, respectively.

The power supply unit 190 provides a power required by various components of the portable terminal 100. The power may be internal power, external power, or a combination thereof.

Various embodiments described herein may be implemented in a computer-readable medium using, for example, computer software, hardware, or some combinations thereof. For hardware implementation, the embodiments described herein may be implemented using one or more applications of specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may be also implemented by the controller 180.

For software implementation, the embodiments described herein may be implemented with separate software modules, such as procedures and functions, each of which performs one or more of the functions and operations described herein. The software codes can be implemented with a software application written in any suitable programming language and may be stored in memory such as the memory 160, and executed by a controller or processor, such as the controller 180.

FIG. 2A is a front perspective diagram of a mobile terminal according to one embodiment of the present disclosure. The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition. The cases 101 and 102 are formed by injection molding of synthetic resin or can be formed of metal substance such as stainless steel (STS), titanium (Ti) or the like for example.

A display 151, an audio output unit 152, a camera 121, user input unit 130 (shown with manipulation units 131 and 132), a microphone 122, an interface 170 and the like can be provided to the terminal body, and more particularly, to the front case 101. The display 151 occupies most of a main face of the front case 101. The audio output unit 152 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

On the other hand, the reference number 133 is a dedicated input unit for operating a camera 121. The dedicated input unit may be a shutter for generating at least two signals such as semi-shutter signal and full shutter signal. In a state that an idle screen is displayed on a display unit 151 of the portable terminal 100, if the shutter 133 is pressed, the camera menu is entered directly. In addition, a taken image may be obtained by executing the auto focusing function.

On the other hand, the reference number 134 is a jog wheel type input device (or a jog wheel) for changing the taking mode of the camera. There is a 'instant mode' in the taking modes which are allotted in the jog wheel. When the still image is taken in the instant mode, the image is taken, according to the present disclosure. Namely, in a state of a semi-shutter (i.e., when a shutter is partially pressed), the resolution of the image is changed. The image having the changed resolution is obtained at the full shutter signal. At this time, the changed resolution may be determined in consideration of a capacity of buffer memory 161. In other words, 5 mega pixel's still image is obtained in other taking mode according to the user's set up. However, 3 mega pixel's image is obtained in the instant mode. The number of pixels may be other than 5 or 3 mega pixels.

Figure 2B:
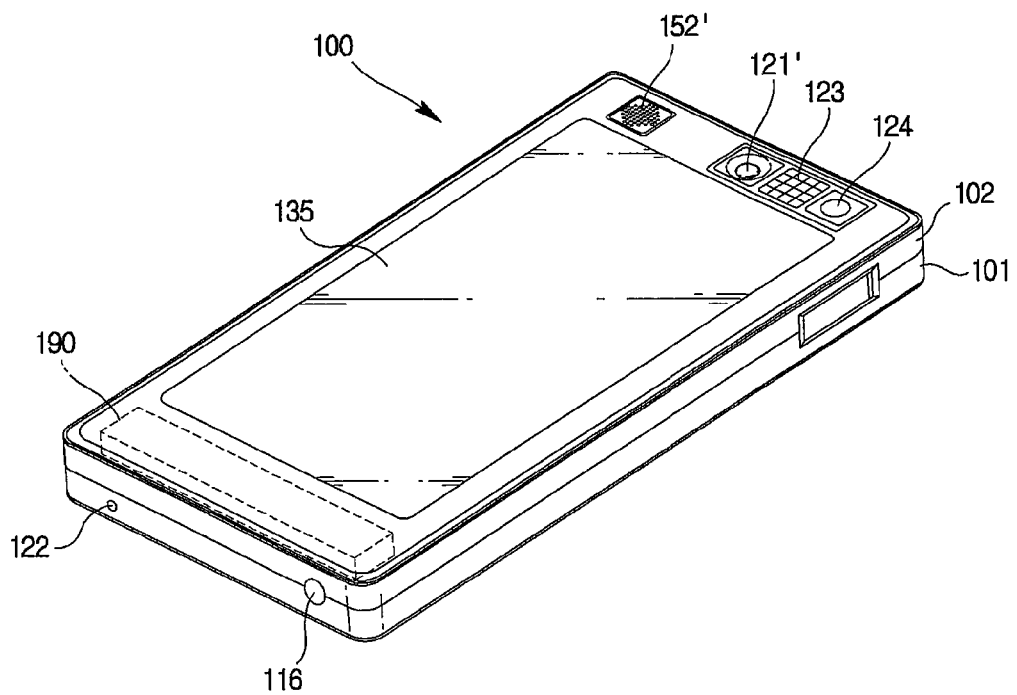
FIG. 2B is a rear perspective view of a portable terminal related to one embodiment of the present disclosure, respectively.

FIG. 2B is a perspective diagram of a backside of the terminal shown in FIG. 2A. Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels (or resolution) differing from those of the former camera 121.

Preferably, for instance, the former camera 121 has low pixels (or resolutions), but still enough to capture and transmit a picture of user's face for a video call, while the latter camera 121' has high pixels (or resolutions) for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the portable terminal 100.

A broadcast signal receiving antenna 116 can be additionally provided to the lateral side of the terminal body as well as an antenna for communication or the like. The antenna 116 constituting a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display 151. In this case, if the display 151 is configured to output visual information from its both faces, it is able to recognize the visual information via the touchpad 135 as well. The information outputted from both of the faces can be entirely controlled by the touchpad 135. Alternatively, a display is further provided to the touchpad 135 so that a touch screen can be provided to the rear case 102 as well.

The touchpad 135 is activated by interconnecting with the display 151 of the front case 101. The touchpad 135 can be provided in rear of the display 151 in parallel. The touchpad 135 can have a size equal to or smaller than that of the display 151.

Figure 3A:
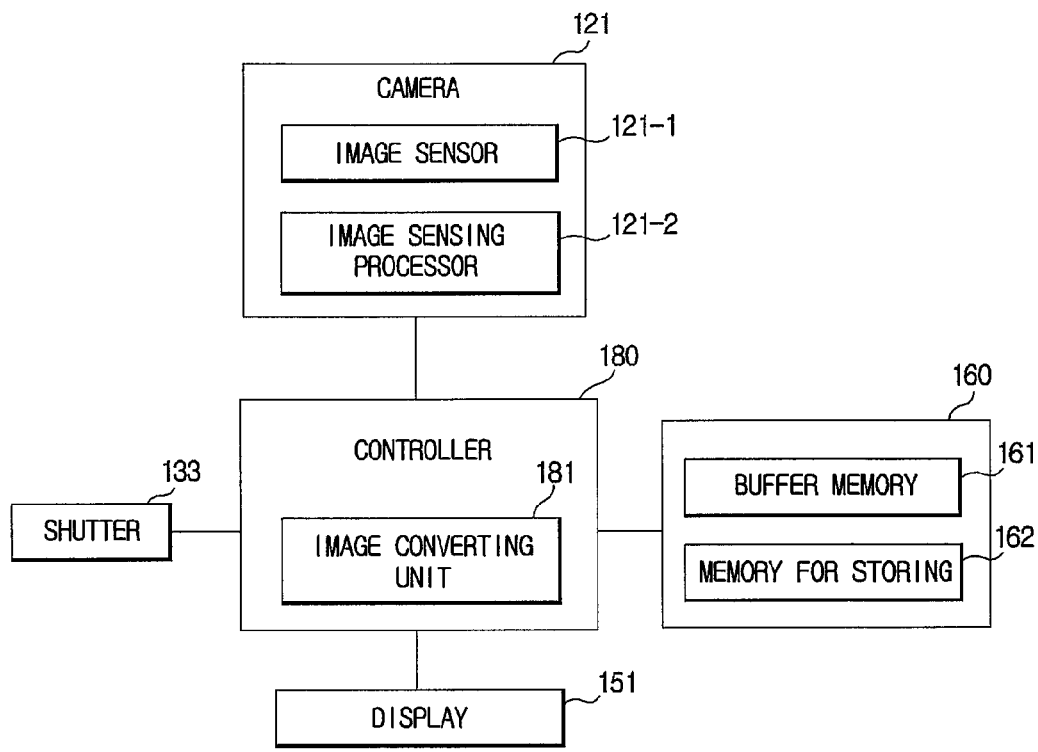
FIGS. 3A and 3B are detailed block diagrams of a portable terminal where a method of processing an image is applied, according to the present disclosure.
Figure 3B:
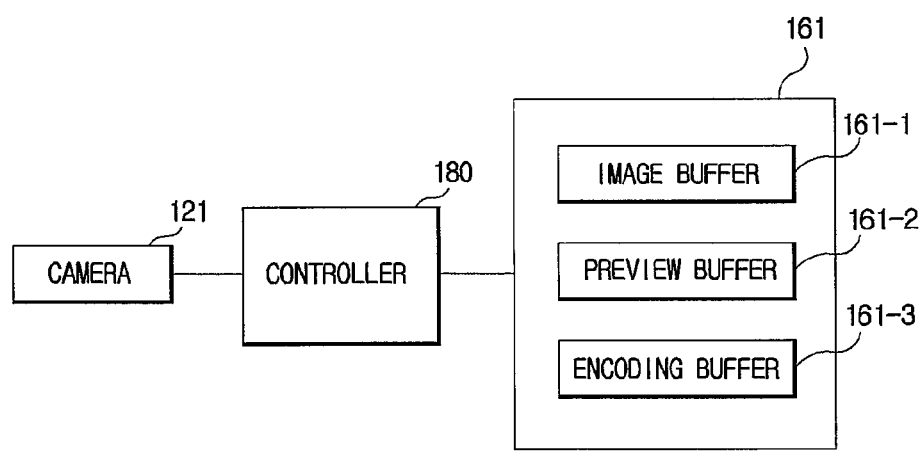

FIGS. 3A and 3B are detailed block diagrams of a portable terminal where a method of processing an image according to the present disclosure is applied. As shown in FIG. 3A, the portable terminal using the method for processing image data according to the present disclosure, may include a camera 121, a shutter 133, a display unit 151, a memory 160, and a controller 180.

The user may enter a camera menu or turn on a camera mode by using the user input unit 130 of the portable terminal 100. When the camera mode turns on, the camera 121 is activated and the image sensor 121-1 converts the optical signal from the lens to the electric signal. Then, the image sensor processor 121-2 converts the electric signal to the digital signal. And, the digital signal is displayed on the display unit 151 as an image. This image may be referred to as a preview image, and is also referred to as a first image in this description. This preview image, which is an image being buffered at a predetermined rate in sequence (or in series), has a preview resolution (herein after, 'first resolution').

A second image is received by re-setting the image sensor 121-1 and the image sensor processor 121-2 when the semi-shutter signal is generated through the shutter 133 while the first image is displayed on the display unit 151. The second image is an image in sequence having a preset resolution (hereinafter, 'a second resolution'). For example, the first image may have a resolution of 320×240 pixels, while the second image may have a resolution of 2592×1944 pixels (5 mega pixels).

Alternatively, the second resolution may be a maximum resolution which the image sensor can have, or other resolutions other than the first resolution. The second resolution may be changed by the user's set up. In addition, an auto focusing function is activated in response to the semi-shutter signal so that a focus on the subject for photography may be accomplished.

When it is not possible to obtain the first image while the image sensor 121-1 and the image sensor processor are reset, the pre-stored image in the memory 160 may be displayed on the display unit 151. The second image obtained by the semi-shutter signal may be stored or buffered in the buffer memory 161. In embodiments of the present disclosure, the second image may be buffered at a predetermined rate in sequence. If buffered, a plurality (or a series) of second images may be sequentially buffered.

The image converting unit 181 may generate a third image for preview by re-sizing the second image stored in the buffer memory 161. This third image may have the same resolution as that of the first image. When the full shutter signal is received from the shutter 133, the controller 180 transmits a still image to the memory for storing 162, wherein the still image is one of the second image stored in the buffer memory 161. This second image may be resized as the third image.

In addition, the controller transmits the re-sync signal to the image sensor 121-1 to re-sync the image sensor 121-1 and the image sensor processor 121-2. Accordingly, the image sensor 121-1 and the image sensor processor 121-2 can receive or obtain the new image (or is able to receive or obtain the new image). So, the new image, which is generated at the full shutter signal, may be stored in the memory for storing 162.

According to the embodiment of the present disclosure, the resolution of the image is changed in response to the semi-shutter signal. Therefore, a time lag which occurs in a related art, due to when a user presses a shutter to generate the full-shutter signal but a resizing occurs after receipt of the full-shutter signal, may be reduced or prevented.

FIG. 3B illustrates the portion block diagram of the portable terminal for explaining a method for storing an image data in the method for processing the image data, according to the present disclosure. As shown in FIG. 3B, the buffer memory 161 of the present disclosure may include an image buffer 161-1, a preview buffer 161-2 and an encoding buffer 161-3. The image buffer 161-1 may store a raw image obtained from the camera 121.

The preview buffer 161-1 may store an image for the display unit from the raw image. For example, the image for the display unit may be a re-sized image in YUV color space, for example. The encoding buffer 161-3 may store an encoded image which is compressed by encoding the raw image, for example, JPEG.

If the buffer memory 161 is used, the second image is used to generate the encoding image and the preview image in response to the semi-shutter signal. In addition, the raw image is removed. Accordingly, a high resolution image may be obtained with a low capacity buffer.

Figure 4:
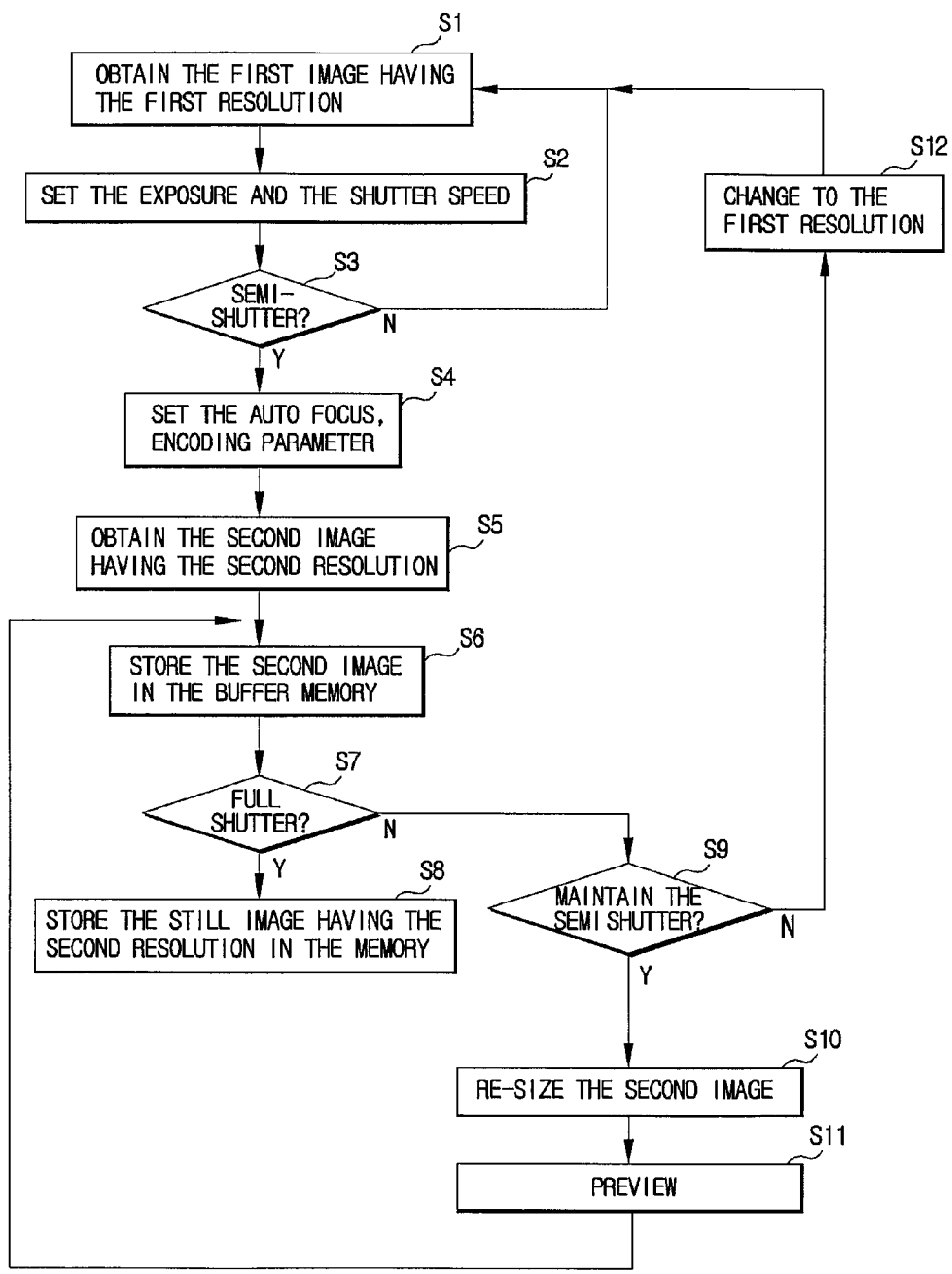
FIG. 4 is a flow chart of the method for processing an image, according to the present disclosure.

In the following description, the method for processing image data which is applied to the portable terminal will be explained with reference to FIG. 4. FIG. 4 is a flow chart of the method for processing an image, according to the present disclosure.

If the user activates the camera 121, the camera 121 obtains the first image having the first resolution. The first image is displayed on the display unit 151 (S1). At this point, the controller sets the exposure and the shutter speed of the camera (S2). Then, when the user half presses (or partly presses) the shutter to generate the semi-shutter signal (s3), the auto focusing function is activated to automatically focus on the subject for photography. In addition, the encoding parameter may be set at this time. As the encoding parameter, any one of the JPEG parameter and the MPEG parameter may be used (S4). In addition, the image sensor 121-1 and the image sensor processor 121-2 of the camera 121 are re-set to a different resolution, such as the second resolution. Accordingly, the second image having the second resolution may be obtained (S5).

During the resetting period, it may not be possible to obtain the image from the camera 121. Therefore, the pre-stored image may be displayed on the display unit 151 by the controller 180 once obtained. The second image is stored in the buffer memory 161 (S6). Then, if the full shutter signal is generated from the shutter 133 (S7), the still image, which is generated at a precise time of pressing of the shutter, is stored in the memory (S8). The still image is one of the second image having the second resolution. At this time, in order to get the still image at that precise time, when the full shutter is pressed, the controller 180 transmits the re-sync signal to the image sensor 121-1 and the image sensor processor 121-2 so that the camera 121 can obtain (or is able to obtain) a new image. Then, the still image having the second resolution may be obtained from the image sensor 121-1.

On the other hand, if the semi-shutter is maintained, the controller 180 may obtain the third image for preview from the second image stored in the buffer memory 161 (S9,S10). The third image is displayed on the display unit 151 (S11). Therefore, the third image may have the same resolution as that of the first image. On the other hand, if the semi-shutter is not maintained, the controller 180 changes the resolution of the image sensor 121-1 to that of the first resolution (s12), and returns to step S1.

Furthermore, the second resolution may be determined according to the taking mode of the camera 121. For example, when the instant mode, which is a mode applying the present disclosure, is used in photographing the image, more of the image may be stored in the buffer memory 161. Therefore, in consideration of the capacity of the buffer, in a case of the instant mode, a different resolution may be applied.

Moreover, in generating the second image, the second image may be encoded to be stored in the memory 161. Then, the high resolution image may be stored in a small capacity buffer.

Figure 5:
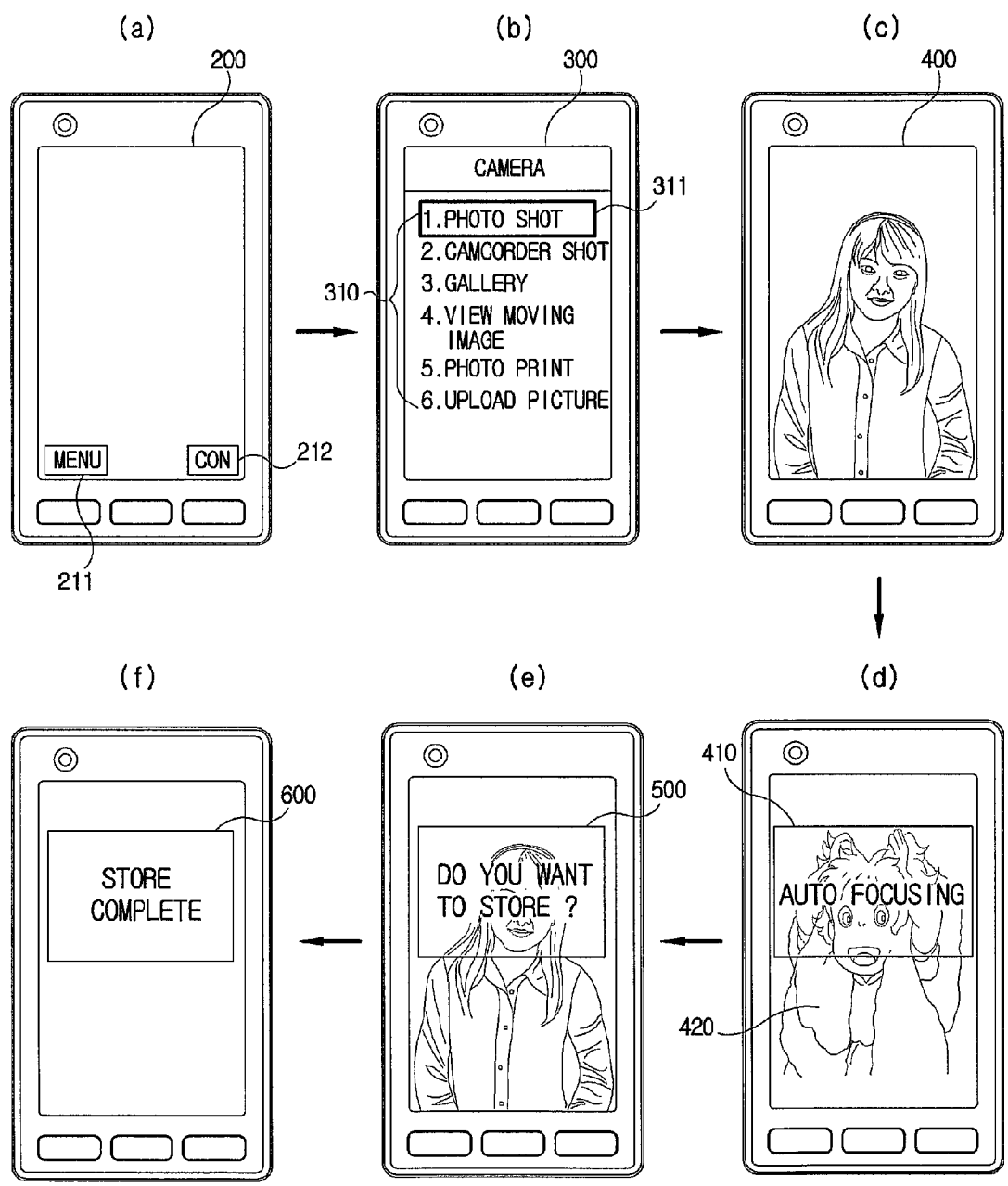
FIG. 5 and FIG. 6 illustrate image diagrams of the portable terminal where the method for processing an image according to one embodiment of the present disclosure is applied, respectively.
Figure 6:
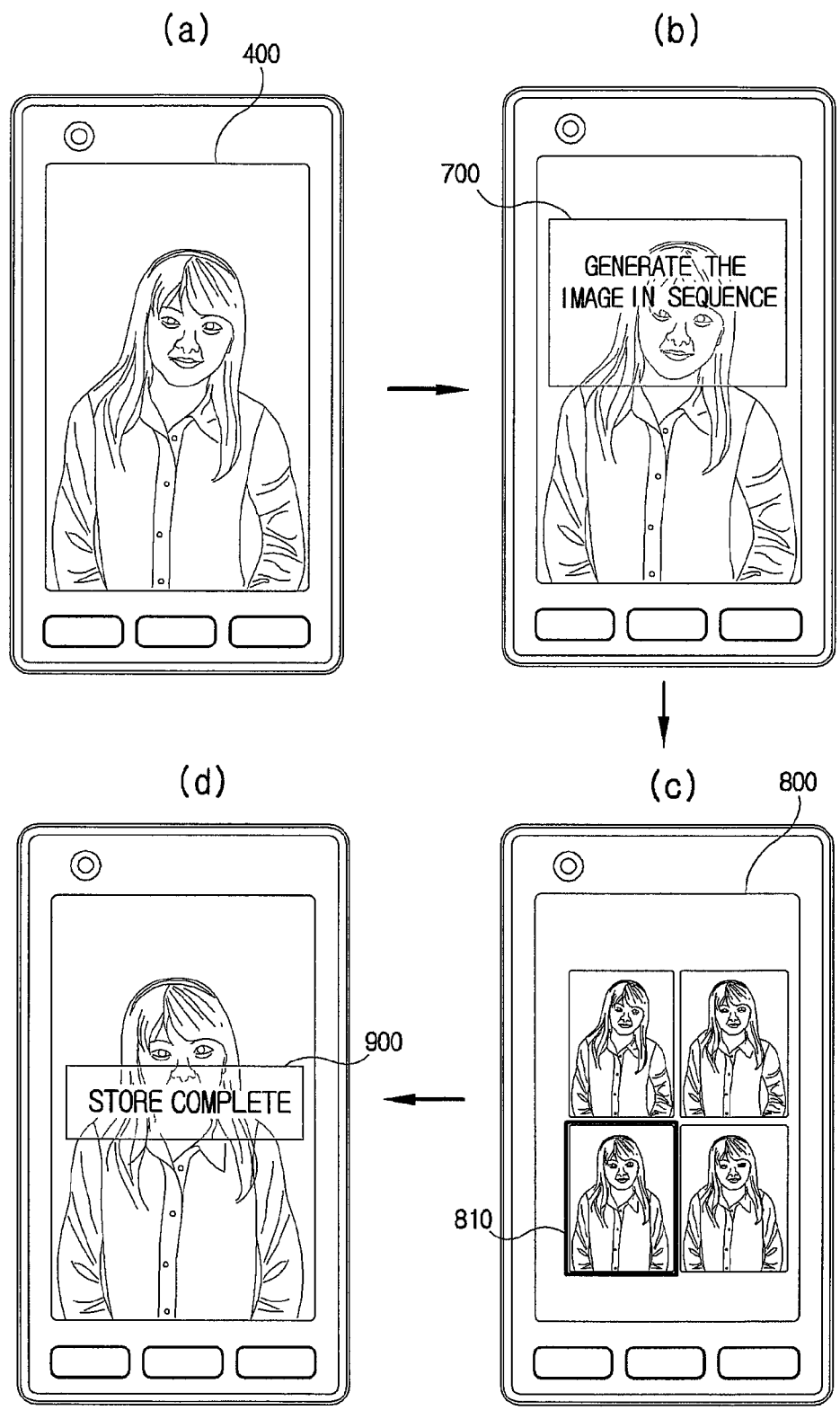

The embodiment of the portable terminal applying the method for processing the image will be explained with reference to FIG. 5. FIG. 5 and FIG. 6 illustrate image diagrams of the portable terminal where the method for processing an image according to one embodiment of the present disclosure is applied, respectively. (a) of FIG. 5 illustrates an idle screen 200 of the portable terminal 100. The idle screen 200 may include a menu icon 211 and a confirmation icon 212. The user may enter the camera menu by using the menu icon 211.

(b) of FIG. 5 illustrates a camera menu screen 300. The camera menu may be automatically entered by pressing the shutter 133 in the idle screen 200. As shown in (b) of FIG. 5, the camera menu may include a plurality of the camera sub menus 310. The camera sub menus 310 may include the photo shot icon 311. If the user selects the photo shot icon 311 by using the user input unit 130, the camera is activated and the preview screen 400 is displayed on the display unit 151, as shown in (c) of FIG. 5.

At this point, the user half presses (partially presses) the shutter 133, which generates the semi-shutter signal. Then, as shown in (d) of FIG. 5, the message 410, "Auto focusing" appears in the display unit 151 and the resolution of the camera is re-set. At this time, the state of the image sensor and the image sensor processor is changed in resetting the resolution of the camera. The camera then enters a 'freeze state', whereby, a substitute image 420 is stored in the memory 160 of the terminal 100.

The substitute image 420 may be changed by the user's set up. Then, if the user fully presses the shutter to generate the full shutter signal, the controller 180 activates the camera 121 to obtain the still image. The message 500, "Do you want to store?", is displayed on the display unit 151, as shown in (e) of FIG. 5). If the user selects the confirmation key in this state, the still image is stored in the memory 160. A store complete message 600 may be displayed on the display unit 151, as shown in (f) of FIG. 5. According to the embodiment aforementioned, the time lag which may occur in photographing the still image as in the related art terminals may be reduced or prevented.

(a) of FIG. 6 illustrates the preview image 400 like that of (c) of FIG. 5. Here, the user half presses (partially presses) the shutter 133 to generate the semi shutter signal. Then, as shown in (b) of FIG. 6, the message, "Generate the image in sequence", is displayed on the display unit. And the resolution of the camera is reset.

After finishing the reset, the plurality of images in sequence may be stored in the memory 160. Then, if the full shutter signal is generated, the controller 180 displays the plurality of images in sequence in the form of thumbnail image on the display unit 151.

Alternatively, when the full shutter signal is generated, the plurality of images in sequence is photographed after that time. Then, the plurality of image is displayed in the form of the thumbnail. (c) of FIG. 6 illustrates the screen where the plurality of images is displayed. In this state, the user may select image 810 that he/she wants. The selected image may be stored in the memory 160. Then, a store complete message 600 may be displayed on the display unit 151 as shown in (d) of FIG. 6.

As aforementioned, the portable terminal having a camera that resizes an image before a full shutter is pressed, is not limited to the constitution and method of the embodiments. It should be understood that the person in the art may easily modify and alter the present disclosure by selectively combining the entire or part of the each embodiment.

What is claimed is:

1. A method for processing image data in a portable terminal, the method comprising:
    obtaining a first image having a first resolution for display from an image obtaining unit of the portable terminal;
    receiving a semi-shutter signal during display of the first image on a display unit of the portable terminal;
    obtaining a second image having a second resolution from the image obtaining unit in response to the semi-shutter signal prior to receiving a full-shutter signal;
    capturing a still image from the second image when the full-shutter signal is received; and
    obtaining a third image having a same resolution as that of the first image by resizing the second image in response to maintaining of the semi-shutter signal, and displaying the third image on the display unit.

2. The method of claim 1, wherein the second resolution is greater than the first resolution.

3. The method of claim 1, wherein the first and second images are a series of buffered images.

4. The method of claim 1, further comprising setting an encoding parameter on the second image in response to the semi-shutter signal.

5. The method of the claim 1, wherein the capturing of a still image from the second image comprises:
    transmitting a re-sync signal to the image obtaining unit once the full-shutter signal is received;
    re-syncing the image obtaining unit in response to the re-sync signal; and
    obtaining the still image from the re-synced image obtaining unit.

6. The method of claim 1, further comprising:
    selecting a taking mode of the still image; and
    determining the second resolution based on the selected taking mode.

7. The method of claim 6, wherein the selecting of a taking mode of the still image comprises using a jog wheel of the portable terminal to select the taking mode of the still image.

8. The method of claim 1, further comprising storing an encoded second image which is generated in response to the semi-shutter signal, and generating a preview image for the second image.

9. The method of claim 1, further comprising displaying a preset fourth image on the display unit while the first resolution is changed to the second resolution in the image obtaining unit in response to the semi-shutter signal.

10. A portable terminal, comprising:
    a camera which includes an image obtaining unit to obtain a first image having a first resolution and a second image having a second resolution;
    a shutter which selectively generates a semi-shutter signal and a full-shutter signal;
    a display unit which displays the first image; and
    a controller which controls display of the first image on the display unit when the camera is activated, and controls the image obtaining unit to obtain the second image when the semi-shutter signal is generated from the shutter during the display of the first image on the display unit and prior to generation of the full-shutter, and controls to obtain a third image having a same resolution as that of the first image by resizing the second image in response to maintaining of the semi-shutter signal, and to display the third image on the display unit.

11. The portable terminal of claim 10, wherein the second resolution is greater than the first resolution.

12. The portable terminal of claim 10, wherein the first and second images are a series of buffered images.

13. The portable terminal of claim 10, wherein the controller controls to set up an encoding parameter on the second image in response to the semi-shutter signal.

14. The portable terminal of claim 10, further comprising a memory, wherein the controller controls to capture a still image from the second image and to store the still image in the memory when the full-shutter signal is received.

15. The portable terminal of claim 10, further comprising a memory, wherein the controller controls to re-sync the image obtaining unit by transmitting a re-sync signal to the image obtaining unit, and to capture the still image from the second image to store the still image in the memory.

16. The portable terminal of claim 15, further comprising a memory, wherein the controller controls to display a preset forth image which is stored in the memory on the display unit while the first resolution is changed to the second resolution in the image obtaining unit in response to the semi-shutter signal.

17. The portable terminal of the claim 15, further comprising a memory, wherein the controller controls to store an encoded second image which is generated in response to the semi-shutter signal, to generate a preview image from the second image, and to display the preview image on the display unit.

18. The portable terminal of claim 10, wherein the controller determines the second resolution based on a selected taking mode, when the selected taking mode of the still image is determined.

19. The portable terminal of claim 18, further comprising a jog wheel used to select the taking mode of the still image.

* * * * *